(12) United States Patent
Kang

(10) Patent No.: US 9,673,978 B2
(45) Date of Patent: Jun. 6, 2017

(54) METHOD, HOST APPARATUS AND MACHINE-READABLE STORAGE MEDIUM FOR AUTHENTICATING A STORAGE APPARATUS

(71) Applicant: Samsung Electronics Co., Ltd., Gyeonggi-do (KR)

(72) Inventor: Bo-Gyeong Kang, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 596 days.

(21) Appl. No.: 13/676,745

(22) Filed: Nov. 14, 2012

(65) Prior Publication Data

US 2013/0124858 A1    May 16, 2013

(30) Foreign Application Priority Data

Nov. 14, 2011  (KR) .................. 10-2011-0118410

(51) Int. Cl.
*H04L 9/08* (2006.01)
*H04L 9/32* (2006.01)

(52) U.S. Cl.
CPC .......... *H04L 9/0891* (2013.01); *H04L 9/3268* (2013.01)

(58) Field of Classification Search
CPC . H04L 9/3268; H04L 63/0823; H04L 9/3263; H04L 9/0891; H04L 9/006; H04L 9/3273; G06Q 20/20
USPC ....................................................... 713/158
See application file for complete search history.

(56) References Cited

U.S. PATENT DOCUMENTS

| | | | |
|---|---|---|---|
| 7,984,200 B1* | 7/2011 | Bombet ................. | G11B 19/02 710/10 |
| 8,914,898 B2* | 12/2014 | Tharakan .......... | G06F 17/30011 726/27 |
| 8,914,902 B2* | 12/2014 | Moritz .................... | G06F 21/10 726/28 |
| 8,918,640 B2* | 12/2014 | Oh ......................... | H04L 9/321 713/158 |

(Continued)

FOREIGN PATENT DOCUMENTS

| | | |
|---|---|---|
| CN | 100517297 | 7/2009 |
| CN | 102906755 | 1/2013 |
| EP | 1 164 748 | 12/2001 |

OTHER PUBLICATIONS

Chinese Office Action dated Jun. 1, 2016 issued in counterpart application No. 201280055951.8, 17 pages.

(Continued)

*Primary Examiner* — Yonas Bayou
(74) *Attorney, Agent, or Firm* — The Farrell Law Firm, P.C.

(57) ABSTRACT

A method, a host apparatus, and a machine-readable storage medium are provided for authenticating a storage apparatus. The method includes acquiring an identification of the storage apparatus based on a request for using content stored in the storage apparatus; determining whether authentication of the identification of the storage apparatus is revoked; determining whether usage of the content is allowed, based on at least one of additional information about the content and additional information about a certificate revocation of the storage apparatus, when the authentication of the identification of the storage apparatus is revoked; and receiving the content from the storage apparatus, when the usage of the content is allowed.

24 Claims, 5 Drawing Sheets

(56) References Cited

U.S. PATENT DOCUMENTS

| | | | |
|---|---|---|---|
| 9,009,358 B1* | 4/2015 | Bombet | G06F 9/4411 |
| | | | 710/10 |
| 9,047,492 B2* | 6/2015 | Burton | G06F 21/78 |
| 9,432,373 B2* | 8/2016 | Ryder | H04L 63/10 |
| 2005/0210241 A1* | 9/2005 | Lee | G06F 21/10 |
| | | | 713/158 |
| 2005/0216739 A1* | 9/2005 | Lee | G06F 21/10 |
| | | | 713/168 |
| 2008/0010685 A1* | 1/2008 | Holtzman | G06F 12/1483 |
| | | | 726/27 |
| 2010/0017626 A1 | 1/2010 | Sato et al. | |
| 2010/0138652 A1* | 6/2010 | Sela | G06F 21/445 |
| | | | 713/158 |
| 2010/0161997 A1 | 6/2010 | Lee et al. | |
| 2010/0235640 A1 | 9/2010 | Satoh | |
| 2011/0082966 A1* | 4/2011 | Yu | G06F 12/1408 |
| | | | 711/103 |

OTHER PUBLICATIONS

European Search Report dated Jun. 24, 2015 issued in counterpart application No. 12849627.0-1870, 7 pages.

* cited by examiner

| REVOKED IDs | REVOCATION REASON (OPTIONAL) | DATA & TIME OF REVOCATION (OPTIONAL) |
|---|---|---|
| A | KEY EXPOSURE | 2011.10.11 |
| C | USE OF ILLEGAL CONTENT | 2011.08.30 |
FIG.3
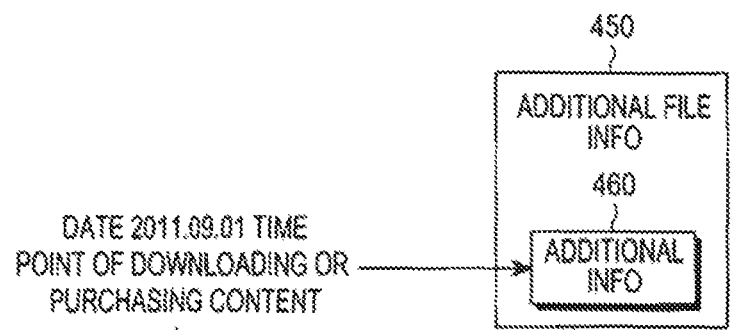
FIG.4B
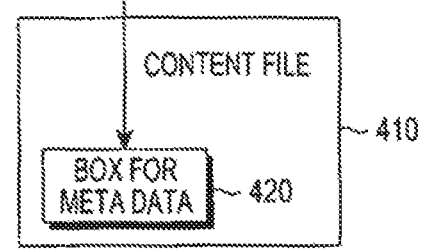
FIG.4A

METHOD, HOST APPARATUS AND MACHINE-READABLE STORAGE MEDIUM FOR AUTHENTICATING A STORAGE APPARATUS

PRIORITY

This application claims priority under 35 U.S.C. §119(a) to a Korean Patent Application Serial No. 10-2011-0118410, which was filed in the Korean Intellectual Property Office on Nov. 14, 2011, the content of which is incorporated herein by reference.

BACKGROUND OF THE INVENTION

1. Field of the Invention

The present invention relates generally to a method and an apparatus for authenticating a storage apparatus, and more particularly to a method and an apparatus, by which a user can maintain a right to access or consume content in an apparatus to be authenticated, such as a storage apparatus or an apparatus for reproducing/recording content, even when a certificate of the apparatus to be authenticated is revoked due to an improper use of the apparatus to be authenticated.

2. Description of the Related Art

An authentication method using a Public Key Infrastructure (PKI) is used to authenticate storage apparatuses including Non-Volatile Memory (NVM) devices, such as a Solid State Drive (SSD) and a flash memory card that store content.

In the PKI authentication method, an apparatus to be authenticated is authenticated or revoked based on a certificate. Certificate revocation implies that all functions allowed by a security system are no longer allowed on an apparatus to be authenticated, which has a revoked identifier. Accordingly, a security system of the apparatus to be authenticated is no longer valid.

Conventionally, when a certificate of a storage apparatus is revoked, regardless of the reason for the certificate revocation, any function for utilizing (e.g., reproducing, copying, etc.) previously-stored content is also revoked with the certificate. Therefore, inconvenience is caused to a user.

SUMMARY OF THE INVENTION

Accordingly, the present invention is designed to address at least one of problems and/or disadvantages related to the prior art, and to provide the advantages described below.

An aspect of the present invention is to provide a gradual certificate revocation system for revoking a predetermined function of a security system based on a reason for certificate revocation.

Another aspect of the present invention is to provide a method in which user properties, such as content that has been acquired before certificate revocation, can be used independently of the revocation of an apparatus, ensuring user ownership.

In accordance with an aspect of the present invention, a method for authenticating a storage apparatus is provided. The method includes acquiring an identification of the storage apparatus based on a request for using content stored in the storage apparatus; determining whether authentication of the identification of the storage apparatus is revoked; determining whether usage of the content is allowed, based on at least one of additional information about the content and additional information about a certificate revocation of the storage apparatus, when the authentication of the identification of the storage apparatus is revoked; and receiving the content from the storage apparatus, when the usage of the content is allowed.

BRIEF DESCRIPTION OF THE DRAWINGS

The above and other features, aspects, and advantages of the present invention will be more apparent from the following detailed description taken in conjunction with the accompanying drawings, in which:

FIG. 3 illustrates a Certificate Revocation List (CRL) according to an embodiment of the present invention;

FIGS. 4A and 4B illustrate an implementation of additional information on content according to an embodiment of the present invention;

DETAILED DESCRIPTION OF EMBODIMENTS OF THE PRESENT INVENTION

Hereinafter, various embodiments of the present invention will be described with reference to the accompanying drawings. In describing the present invention, a detailed description of publicly-known functions or configurations related to the present invention will be omitted in order to prevent the subject matter of the present invention from being unclear.

Figure 1:
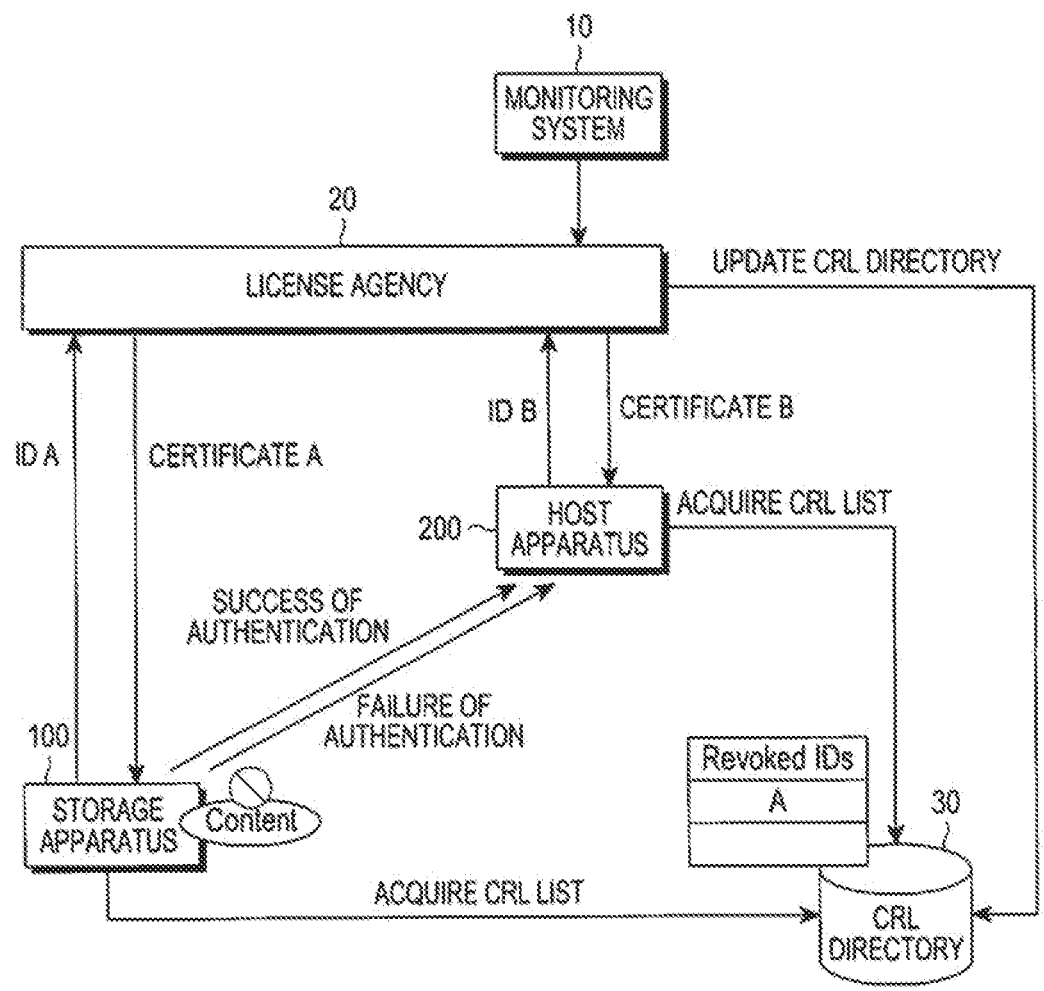
FIG. 1 illustrates an authentication system according to an embodiment of the present invention.

FIG. 1 illustrates an authentication system according to an embodiment of the present invention.

Referring to FIG. 1, the authentication system includes a monitoring system 10, a license agency 20, a Certificate Revocation List (CRL) directory 30, a storage apparatus 100, and a host apparatus 200. The monitoring system 10 interlocks with the license agency 20, or may be included in the license agency 20. When the monitoring system 10 identifies an apparatus that should have its certificate revoked, the monitoring system 10 reports information on the apparatus to the license agency 20. For example, conditions of certificate revocation include when an encryption key of the apparatus is exposed, when the apparatus uses illegal content, and when a validity period of a certificate of the apparatus expires.

The license agency 20 is a server apparatus that communicates with the storage apparatus 100 and the host apparatus 200. When the license agency 20 receives a report on an apparatus to have its certificate revoked, from the monitoring system 10, the license agency 20 updates a CRL within the CRL directory 30.

Further, the license agency 20 receives, from the storage apparatus 100, a request message for issuing a first certificate including an IDentification (ID) (ID A) of the storage apparatus 100 and then transmits a first response message including a first certificate (certificate A) to the storage apparatus 100. Additionally, the license agency 20 receives, from the host apparatus 200, a request message for issuing a second certificate including an ID (ID B) of the host apparatus 200 and then transmits a second response message including a second certificate (certificate B) to the host apparatus 200.

The CRL directory 30 is a server apparatus that communicates with the storage apparatus 100, the host apparatus 200, and the license agency 20, and may be included in the license agency 20 or may be installed in a separate server apparatus. The CRL directory 30 stores the CRL including IDs of apparatuses that are to have their certificates revoked.

Each of the host apparatus 200 and the storage apparatus 100 receives the CRL from the CRL directory 30. The host apparatus 200 and the storage apparatus 100 may authenticate each other by using the CRL.

Alternatively, the host apparatus 200 may authenticate the storage apparatus 100 in a single direction. In this case, the storage apparatus 100 does not need to receive the CRL from the CRL directory 30. Further, the storage apparatus 100 may receive a CRL from the host apparatus 200.

The host apparatus 200 authenticates the storage apparatus 100 after receiving a user command for accessing or using content, and accesses the content stored in the storage apparatus 100, when the authentication of the storage apparatus 100 is successful. When the authentication of the storage apparatus 100 fails, the host apparatus 200 performs a separate authentication process on the content.

Figure 2:
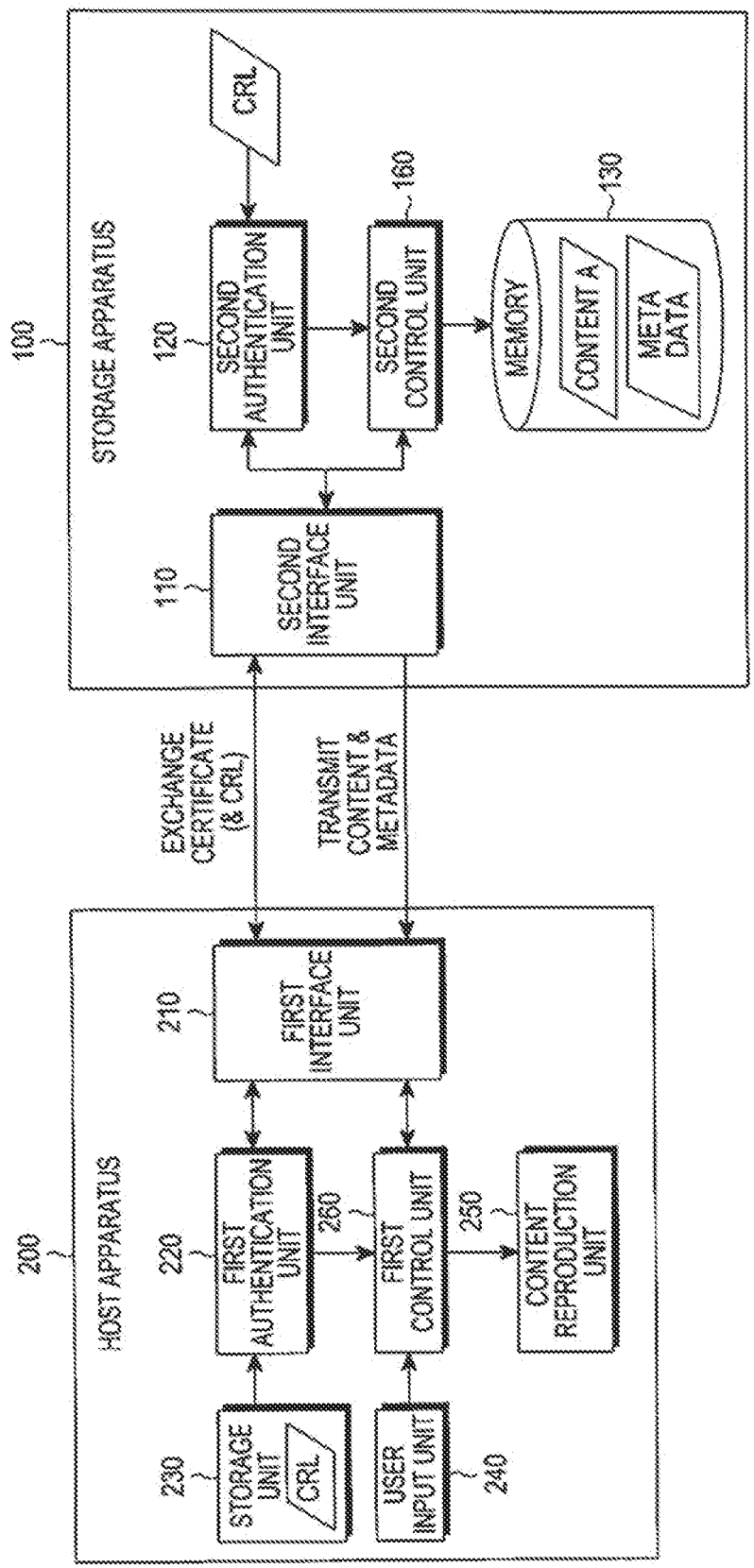
FIG. 2 is a block diagram illustrating a host apparatus and a storage apparatus according to an embodiment of the present invention.

FIG. 2 is a block diagram illustrating a host apparatus and a storage apparatus according to an embodiment of the present invention.

The host apparatus 200 may be a Digital Television (DTV), a portable communication terminal, such as a smart phone or a Personal Digital Assistant (PDA), or a Personal Computer (PC), makes use of (e.g., writing, reading, and erasing) the storage apparatus 100, and reproduces media content stored in the storage apparatus 100 or records content in the storage apparatus 100. The content may or may not be encrypted, and the host apparatus 200 may encrypt content and may store the encrypted content, or may decrypt encrypted content.

Referring to FIG. 2, the host apparatus 200 includes a first interface unit 210, a first authentication unit 220, a storage unit 230, a user input unit 240, a content reproduction unit 250, and a first control unit 260. Herein, the term "unit" refers to a device or a combination of software and a device.

Additionally, although the first authentication unit 220, the content reproduction unit 250, and the first control unit 260 are illustrated as separate components in FIG. 2, these components may be embodied as a single controller, such as a microprocessor.

The first interface unit 210, which is a wired or wireless communication apparatus, modulates data input from the first authentication unit 220 or the first control unit 260, into a wired or wireless signal, and transmits the wired or wireless signal to the storage apparatus 100. The first interface unit 210 demodulates a wired or wireless signal input from the storage apparatus 100, into data, and outputs the data to the first authentication unit 220 or the first control unit 260.

The first authentication unit 220 authenticates the storage apparatus 100 based on whether a first certificate is revoked. When the authentication of the storage apparatus 100 fails, in order to determine whether the continued use of requested content is appropriate, the first authentication unit 220 authenticates content stored in the storage apparatus 100, based on additional information on revocation or additional information on content.

FIG. 3 illustrates a Certificate Revocation List (CRL) according to an embodiment of the present invention.

Referring to FIG. 3, the CRL includes an ID of an apparatus identified for certificate revocation, an exposure of an encryption key, a use of illegal content, a reason for certificate revocation, e.g., the expiration of a validity period of a certificate, date and time of revocation, etc.

The user input unit 240 receives the selection of content, a command for consuming content, etc., from the user, and delivers them to the first control unit 260. In order to select content, as described above, in accordance with an embodiment of the present invention, the first control unit 260 sends a request for a stored content list to the storage apparatus 100, receives the stored content list, and displays the received content list to the user on a display unit included in the content reproduction unit 250.

The storage unit 230 stores a CRL, a second certificate, an authentication protocol, and data, such as content which is to be stored in the storage apparatus 100.

The first control unit 260 receives a report on whether the authentication of the storage apparatus 100 is successful, from the first authentication unit 220. When the authentication of the storage apparatus 100 is successful, the first control unit 260 performs an operation requested by the user on the content selected by the user. For example, the first control unit 260 performs a function for recording content, a function for reproducing content, etc. The first control unit 260 stores content including metadata corresponding to additional information about the content, or a metadata file including content and additional information about the content, in the storage apparatus 100. The first control unit 260 receives content from the storage apparatus 100, and may then reproduce the content.

The content reproduction unit 250 reproduces content requested by the user according to the control of the first control unit 260. The content reproduction unit 250 includes a display unit, such as a Liquid Crystal Display (LCD) or a touch screen, and a speaker for outputting a sound.

FIGS. 4A and 4B illustrate an implementation of additional information on content according to an embodiment of the present invention.

Referring to FIG. 4A, additional information about content is inserted into a box 420 for metadata, which is included in a content file 410.

Referring to FIG. 4B, additional information 460 about content is inserted into an additional information file 450 generated independently of the content file 410. For example, the additional information 460 about the content may include date and time of downloading or purchasing the content file from a content provider, whether the content file 410 requires security, a validity period of security of the content file, etc. When a date of downloading the content file 410 from a content provider is 2011.09.01, this date may be inserted into the content file 410 or the separate additional information file 450.

Figures 5A, 5B:
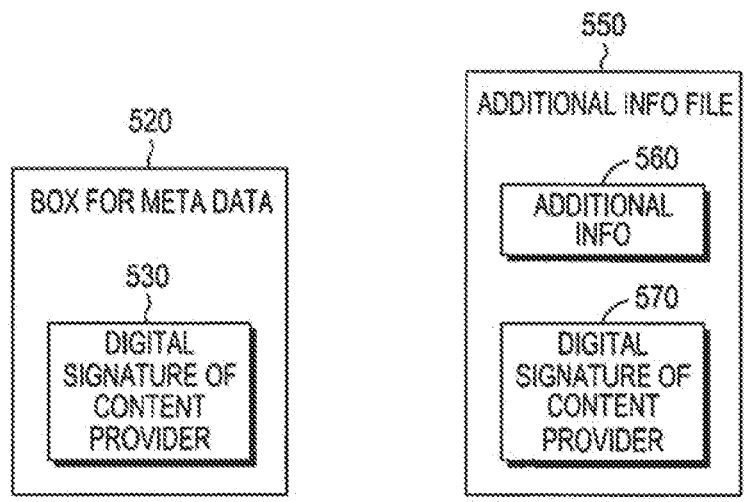
FIGS. 5A and 5B illustrate an implementation of additional information on content according to an embodiment of the present invention.

FIGS. 5A and 5B illustrate an implementation of additional information on content according to an embodiment of the present invention.

Referring to FIG. 5A, additional information about content that is inserted into a box 520 for metadata is included in a digital signature 530 of a content provider, i.e., a content certificate.

Referring to FIG. 5B, a digital signature 570 of a content provider is inserted into an additional information file 550 independently of additional information 560 about the content. As described above, a digital signature of a content provider may be used to secure the reliability of additional information.

An example of a digital signature of a content provider, i.e., a content certificate, will be described below.

A digital signature of a content provider=Sign(a secret key of a content provider, additional information on content)

Namely, the term "digital signature" refers to a signature generated based on additional information about content by using a secret key of a content provider. As described above, in order to separately manage whether content is appropriate, a certificate of the content may be independently constructed.

The storage apparatus 100 safely stores media content and content-related information, and for example, may be a Secure Digital (SD) card, a Universal Serial Bus (USB) memory, a Solid State Drive (SSD), a Hard Disk Drive (HDD), etc.

Referring again to FIG. 2, the storage apparatus 100 includes a second interface unit 110, a second authentication unit 120, a memory 130, and a second control unit 160. Although the second authentication unit 120 and the second control unit 160 are illustrated as separate components in FIG. 2, these components may be embodied as a single controller, such as a microprocessor.

The second interface unit 110, which is a wired or wireless communication apparatus, modulates data input from the second authentication unit 120 or the second control unit 160, into a wired or wireless signal, and transmits the wired or wireless signal to the host apparatus 200. The second interface unit 110 demodulates a wired or wireless signal input from the host apparatus 200, into data, and outputs the data to the second authentication unit 120 or the second control unit 160.

The second authentication unit 120 authenticates the host apparatus 200 based on whether a second certificate is revoked.

The memory 130, e.g., a non-volatile memory, stores a CRL, content, an additional information file, etc.

The second control unit 160 receives a report on whether the authentication of the host apparatus 200 is successful, from the second authentication unit 120. When the authentication of the host apparatus 200 is successful, the second control unit 160 transmits content requested by the host apparatus 200 to the host apparatus 200.

Figure 6:
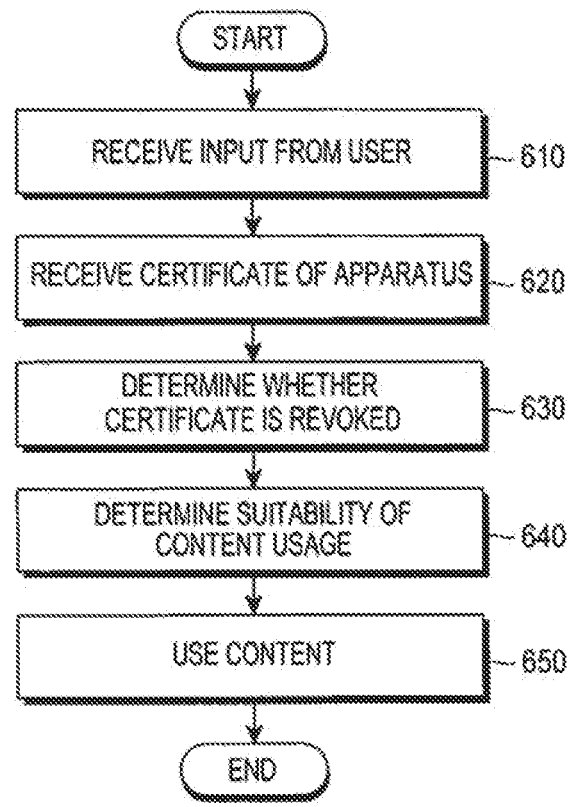
FIG. 6 is a flowchart illustrating a method for authenticating a storage apparatus by a host apparatus according to an embodiment of the present invention.

FIG. 6 is a flowchart illustrating a method for authenticating a storage apparatus by a host apparatus according to an embodiment of the present invention.

Referring to FIG. 6, the host apparatus receives input from a user in step 610, receives a certificate of an apparatus in step 620, determines whether the certificate is revoked in step 630, determines the suitability of content usage in step 640, and uses the content in step 650.

More specifically, in receiving input from a user in step 610, the first control unit 260 receives a command for accessing or using (e.g., reproducing, copying, etc.) content from the user through the user input unit 240, such as a keypad, a keyboard, or a touch panel.

In receiving a certificate of an apparatus in step 620, the first authentication unit 220 sends a request for a first certificate to the storage apparatus 100 through the first interface unit 210, and receives the first certificate from the storage apparatus 100. The first authentication unit 220 may transmit a second certificate to the storage apparatus 100, at a request of the storage apparatus 100 or automatically.

In determining whether the certificate is revoked in step 630, the first authentication unit 220 extracts an ID A of the storage apparatus 100 from the first certificate, and determines whether the ID A exists in a CRL stored in the storage unit 230. Namely, the first authentication unit 220 searches for the ID A of the storage apparatus 100 in the previously-stored CRL.

When the ID A of the storage apparatus 100 is found, the first authentication unit 220 determines that the authentication of the ID A of the storage apparatus 100 is revoked. Alternatively, the first authentication unit 220 may directly receive the ID A of the storage apparatus 100 from the storage apparatus 100.

In determining the suitability of content usage in step 640, the first authentication unit 220 performs authentication of content stored in the storage apparatus 100. The first authentication unit 220 performs authentication of the content based on at least one of additional information about the revocation, which includes a revocation reason, date and time of revocation, etc., and additional information about the content, which includes date and time of downloading or purchasing a content file, whether the content file requires security, etc. The first authentication unit 220 sends a request for the additional information about the content to the storage apparatus 100. In response to the request, the second authentication unit 120 of the storage apparatus 100 transmits the additional information about the content to the storage apparatus 100.

When the content does not require security, the first authentication unit 220 may determine that the access or consumption of the content is appropriate.

When the date and time of downloading or purchasing the content precedes date and time of revoking the first certificate, the first authentication unit 220 may determine that the access or consumption of the content is appropriate.

In using the content in step 650, the first control unit 260 requests the storage apparatus 100 to transmit the content, receives the content from the storage apparatus 100, and uses the content.

For example, the first control unit 260 delivers the content to the content reproduction unit 250, and the content reproduction unit 250 reproduces the content. Alternatively, the first control unit 260 stores the content in the storage unit 230.

Figure 7:
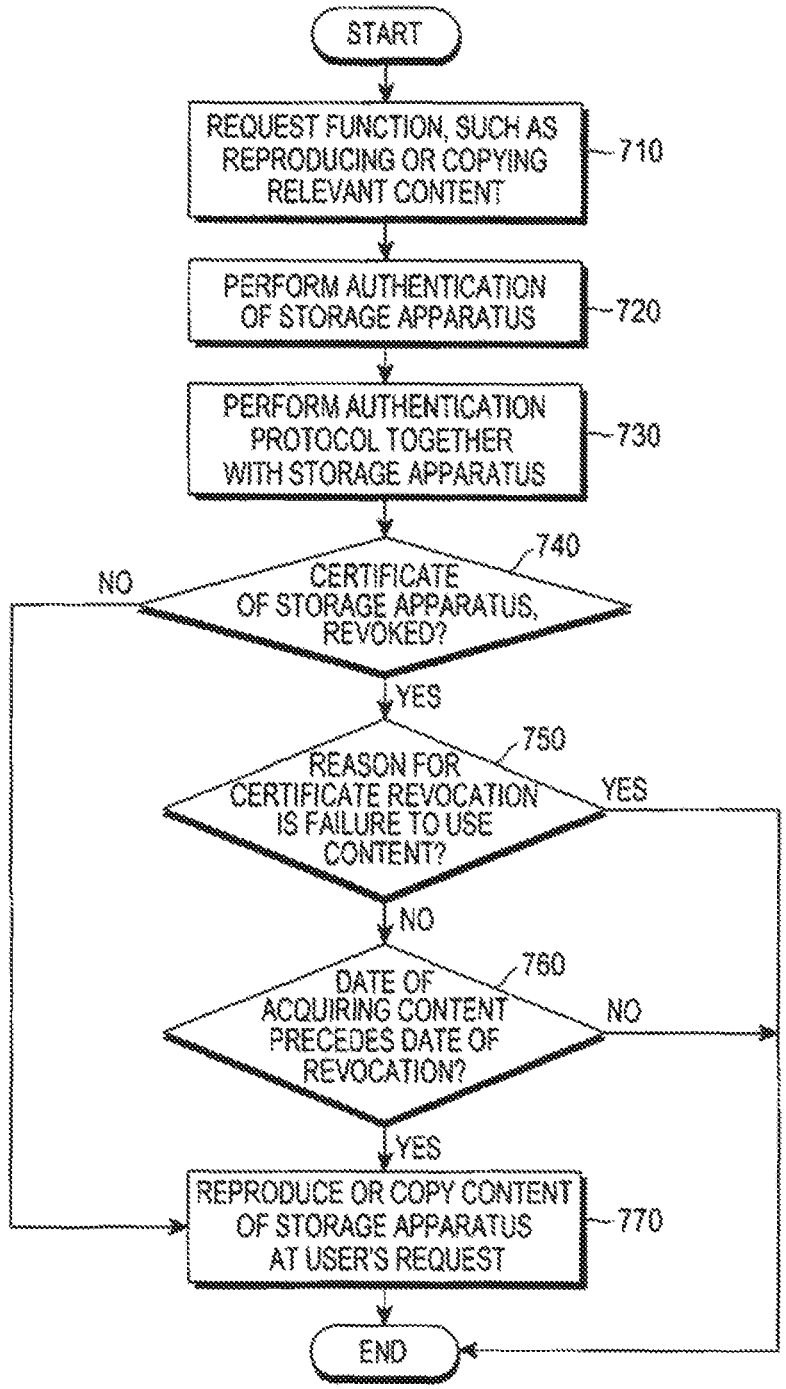
FIG. 7 is a flowchart illustrating a method for authenticating a storage apparatus by a host apparatus according to another embodiment of the present invention.

FIG. 7 is a flowchart illustrating a method for authenticating a storage apparatus by a host apparatus according to another embodiment of the present invention.

Referring to FIG. 7, content stored in the storage apparatus is selected by a user or an application, and a request is made for performing a function of reproducing content, a function of moving content, or a function of copying content in step 710. For example, such a command for accessing or using content may be input to the first control unit 260 through the user input unit 240 by the user, or may be input to the first control unit 260 by a content-related application executed on the host apparatus 200.

In step 720, in order to perform authentication of the storage apparatus 100, the first control unit 260 delivers a command for performing authentication to the first authentication unit 220. For example, a command for performing authentication includes information on the selected content and information on a user command.

In step 730, the first authentication unit 220 performs an authentication procedure between itself and the storage apparatus 100 according to an authentication protocol previously stored in the storage unit 230. The authentication procedure may be a mutual authentication between the host apparatus 200 and the storage apparatus 100, or a singledirectional authentication of the storage apparatus 100 performed by the host apparatus 200.

The first authentication unit 220 sends a request for a first certificate and additional information about the content to the storage apparatus 100 through the first interface unit 210, and receives the first certificate from the storage apparatus 100. Alternatively, the first authentication unit 220 receives an ID A of the storage apparatus 100 from the storage apparatus 100.

In step 740, the first authentication unit 220 determines whether the ID A of the storage apparatus 100 exists in a CRL stored in the storage unit 230, based on the first certificate, i.e., determines whether the first certificate of the storage apparatus 100 is revoked. When the first certificate of the storage apparatus 100 is revoked, the first authentication unit 220 identifies a revocation reason from the CRL, and completes this authentication procedure when the revocation reason is a failure to use the content in step 750. A criterion of this failure to use content complies with a predetermined authentication protocol. For example, a case where a revocation reason of the authentication protocol is the use of illegal content, the revocation reason may be determined as corresponding to a failure to use content.

However, when the revocation reason is not the failure to use the content, the first authentication unit 220 compares a date of acquiring the content with a date of revoking the first certificate in step 760.

When the date of acquiring the content precedes the date of revoking the first certificate in step 760 or when the first certificate of the storage apparatus 100 is not revoked in step 740, the first control unit 260 requests the storage apparatus 100 to transmit content, receives the content from the storage apparatus 100, and uses (e.g., reproduces, copies, etc.) the content at the user's request in step 770.

However, when the date of acquiring the content falls behind the date of revoking the first certificate in step 760, the authentication procedure is completed.

As described above, although the method for determining the suitability of an apparatus based on a certificate of a PKI system has been described, the present invention may be similarly applied even to a system using a broadcast key management system or the like.

It will be appreciated that the above-described embodiments of the present invention may be implemented in the form of hardware or a combination of hardware and software. Any such software may be stored in a volatile or non-volatile storage device such as a Read-Only Memory (ROM), or in a memory such as a Random Access Memory (RAM), a memory chip, a memory device or a memory integrated circuit, or in a storage medium, such as a Compact Disc (CD), a Digital Versatile Disc (DVD), a magnetic disk or a magnetic tape, which is optically or magnetically recordable and simultaneously, is readable by a machine, regardless of whether the software can be deleted or rewritten. It will be appreciated that a storage unit or a memory is an example of a machine-readable storage medium suitable for storing a program or programs including directions for implementing the exemplary embodiments of the present invention. Accordingly, the present invention includes a program including a code for implementing a method claimed in any claim of this specification, and a machine-readable storage medium for storing this program. Also, this program may be electronically conveyed via any medium such as a communication signal transmitted through a wired or wireless connection, and the present invention suitably includes equivalents of this program.

A described above, the embodiments of the present invention prevent a situation where an appropriate owner of content may not consume previously owned content due to the failure of authentication of an apparatus, and provides a method for ensuring a user's ownership, based on various revocation reasons and a time point of the user's acquisition (for example, a time of purchasing content).

While the present invention has been shown and described with reference to certain embodiments thereof, it will be understood by those skilled in the art that various changes in form and details may be made therein without departing from the spirit and scope of the present invention, as defined by the appended claims and any equivalents thereof.

What is claimed is:

1. A method for authentication between a host apparatus and a storage apparatus, the method comprising the steps of:
   sending a host certificate of the host apparatus to the storage apparatus;
   receiving a storage certificate of the storage apparatus from the storage apparatus;
   checking a first revocation list stored in the host apparatus to ensure that the storage apparatus has not been revoked;
   determining that the storage apparatus has been revoked if an IDentification (ID) for the storage certificate of the storage apparatus is found in the first revocation list; and
   exchanging, with the storage apparatus, the first revocation list stored in the host apparatus and a second revocation list stored in the storage apparatus.

2. The method of claim 1, further comprising:
   receiving the host certificate from a license agency.

3. The method of claim 1, further comprising:
   determining that the storage apparatus has not been revoked if the ID for the storage certificate of the storage apparatus is not found in the first revocation list.

4. The method of claim 3, further comprising:
   allowing usage of content stored in the storage apparatus when it is determined that the storage apparatus has not been revoked,
   wherein the usage of the content comprises one of reproducing the content, moving the content, and copying the content.

5. The method of claim 1, wherein the storage apparatus stores the second revocation list, checks the second revocation list to ensure that the host apparatus has not been revoked, and determines that the host apparatus has been revoked if an ID for the host certificate of the host apparatus is found in the second revocation list.

6. A non-transitory machine-readable storage medium for recording a program, which when executed, performs a method for authentication between a host apparatus and a storage apparatus, the method comprising the steps of:
   sending a host certificate of the host apparatus to the storage apparatus;
   receiving a storage certificate of the storage apparatus from the storage apparatus;
   checking a first revocation list stored in the host apparatus to ensure that the storage apparatus has not been revoked;
   determining that the storage apparatus has been revoked if an IDentification (ID) for the storage certificate of the storage apparatus is found in the first revocation list; and exchanging, with the storage apparatus, the first revocation list stored in the host apparatus and a second revocation list stored in the storage apparatus.

7. The non-transitory machine-readable storage medium of claim 6, the method further comprising:
receiving the host certificate from a license agency.

8. The non-transitory machine-readable storage medium of claim 6, the method further comprising:
determining that the storage apparatus has not been revoked if the ID for the storage certificate of the storage apparatus is not found in the revocation list.

9. The non-transitory machine-readable storage medium of claim 6, wherein the storage apparatus stores the second revocation list, checks the second revocation list to ensure that the host apparatus has not been revoked, and determines that the host apparatus has been revoked if an ID for the host certificate of the host apparatus is found in the second revocation list.

10. A host apparatus for authentication between a host apparatus and a storage apparatus, the host apparatus comprising:
a non-transitory memory storing a first revocation list; and
a controller configured to:
send a host certificate of the host apparatus to the storage apparatus;
receive a storage certificate of the storage apparatus from the storage apparatus;
check the first revocation list to ensure that the storage apparatus has not been revoked;
determine that the storage apparatus has been revoked if an IDentification (ID) for the storage certificate of the storage apparatus is found in the first revocation list; and
exchanging, with the storage apparatus, the first revocation list stored in the host apparatus and a second revocation list stored in the storage apparatus.

11. The host apparatus of claim 10, wherein the controller is configured to determine that the storage apparatus has not been revoked if the ID for the storage certificate of the storage apparatus is not found in the first revocation list.

12. The host apparatus of claim 11, wherein the controller is configured to allow usage of content stored in the storage apparatus when it is determined that the storage apparatus has not been revoked,
wherein the usage of the content comprises one of reproducing the content, moving the content, and copying the content.

13. The host apparatus of claim 10, wherein the storage apparatus stores the second revocation list, checks the second revocation list to ensure that the host apparatus has not been revoked, and determines that the host apparatus has been revoked if an ID for the host certificate of the host apparatus is found in the second revocation list.

14. A method for authentication between a host apparatus and a storage apparatus, the method comprising the steps of:
receiving a host certificate of the host apparatus from the host apparatus;
checking a second revocation list stored in the storage apparatus to ensure that the host apparatus has not been revoked;
determining that the host apparatus has been revoked if an IDentification (ID) for the host certificate of the host apparatus is found in the second revocation list;
sending a storage certificate of the storage apparatus to the host apparatus; and
exchanging, with the host apparatus, a first revocation list stored in the host apparatus and the second revocation list stored in the storage apparatus.

15. The method of claim 14, further comprising:
receiving the storage certificate from a license agency.

16. The method of claim 14, further comprising:
determining that the host apparatus has not been revoked if the ID for the host certificate of the host apparatus is not found in the second revocation list.

17. The method of claim 16, further comprising:
allowing usage of content stored in the storage apparatus when it is determined that the host apparatus has not been revoked,
wherein the usage of the content comprises one of reproducing the content, moving the content, and copying the content.

18. The method of claim 14, further comprising:
restricting reproduction of content stored in the storage apparatus when it is determined that the host apparatus has been revoked.

19. The method of claim 14, wherein the host apparatus stores the first revocation list, checks the first revocation list to ensure that the storage apparatus has not been revoked, and determines that the storage apparatus has been revoked if an ID for the storage certificate of the storage apparatus is found in the first revocation list.

20. A storage apparatus for authentication between a host apparatus and the storage apparatus, the storage apparatus comprising:
a non-transitory memory storing a second revocation list; and
a controller configured to:
receive a host certificate of the host apparatus from the host apparatus;
check the second revocation list stored in the storage apparatus to ensure that the host apparatus has not been revoked;
determine that the host apparatus has been revoked if an IDentification (ID) for the host certificate of the host apparatus is found in the second revocation list;
send a storage certificate of the storage apparatus to the host apparatus; and
exchanging, with the host apparatus, a first revocation list stored in the host apparatus and the second revocation list stored in the storage apparatus.

21. The storage apparatus of claim 20, wherein the controller is configured to determine that the host apparatus has not been revoked if the ID for the host certificate of the host apparatus is not found in the second revocation list.

22. The storage apparatus of claim 20, wherein the controller is configured to allow usage of content stored in the storage apparatus when it is determined that the host apparatus has not been revoked,
wherein the usage of the content comprises one of reproducing the content, moving the content, and copying the content.

23. The storage apparatus of claim 20, wherein the controller is configured to restrict reproduction of content stored in the storage apparatus when it is determined that the host apparatus has been revoked.

24. The storage apparatus of claim 20, wherein the host apparatus stores the first revocation list, checks the first revocation list to ensure that the storage apparatus has not been revoked, and determines that the storage apparatus has been revoked if an ID for the storage certificate of the storage apparatus is found in the first revocation list.

* * * * *